US006290549B1

(12) United States Patent
Nath et al.

(10) Patent No.: US 6,290,549 B1
(45) Date of Patent: Sep. 18, 2001

(54) DISTRIBUTOR FOR TELECOMMUNICATIONS INSTALLATIONS

(75) Inventors: Torsten Nath, Berlin; Bernd Butzke, Diessen, both of (DE)

(73) Assignee: RXS Kabelgarnituren GmbH, Hagen (DE)

( * ) Notice: Subject to any disclaimer, the term of this patent is extended or adjusted under 35 U.S.C. 154(b) by 0 days.

(21) Appl. No.: 09/380,986

(22) PCT Filed: Mar. 11, 1998

(86) PCT No.: PCT/DE98/00715

§ 371 Date: Sep. 13, 1999

§ 102(e) Date: Sep. 13, 1999

(87) PCT Pub. No.: WO98/41034

PCT Pub. Date: Sep. 17, 1998

(30) Foreign Application Priority Data

Mar. 13, 1997 (DE) .............................................. 197 10 481

(51) Int. Cl.⁷ ..................................................... H01R 9/22
(52) U.S. Cl. ............................................. 439/715; 439/719

(58) Field of Search ..................................... 439/719, 715, 439/374; 361/823, 826, 827, 824, 119, 426, 120, 413, 415; 379/327, 824, 326

(56) References Cited

U.S. PATENT DOCUMENTS 3,518,611 * 6/1970 Shores, Jr. .............................. 439/54

FOREIGN PATENT DOCUMENTS

| 20 48 104 | 4/1979 | (DE) . |
| 26 58 296 | 4/1985 | (DE) . |
| 40 30 444 | 4/1992 | (DE) . |
| 2 346 927 | 10/1977 | (FR) . |

* cited by examiner

*Primary Examiner*—Brian Sircus
*Assistant Examiner*—Son V. Nguyen
(74) *Attorney, Agent, or Firm*—Schiff Hardin & Waite

(57) ABSTRACT

In-line contact components of the distributor are composed of front parts and rear strips. The front parts are provided with connecting elements for incoming and outgoing lines. The strips are a single-piece component of a stable rear part which is common to all the front parts. As a result, the outlay on production for the distributor is reduced.

4 Claims, 1 Drawing Sheet

DISTRIBUTOR FOR TELECOMMUNICATIONS INSTALLATIONS

BACKGROUND OF THE INVENTION

The invention relates to a distributor for telecommunications installations, which has connecting elements arranged at the front in parallel rows for incoming and outgoing lines, and the connecting elements of two adjacent rows are connected to contact parts which project into the interior of the distributor.

A distributor of this type has been disclosed, for example, by DE 26 58 296 C. According to that document, the connecting elements and the contact parts of the two rows are fastened in a disk-like front part, which can be anchored in a flat rear part. The front part and the rear part together form a flat contact component. It is usual to combine contact components of this type together with disk-like wire guide elements in a carrier to form a block-like distributor module, such as has been disclosed, for example, by DE 20 48 104 C.

SUMMARY OF THE INVENTION

The invention is based on the object of reducing the production outlay for the distributor. This object is achieved by an improvement in a distributor having connecting elements arranged in parallel rows for incoming and outgoing lines, the connecting elements of two adjacent wires in each case being connected to contact parts which project into an interior of the distributor, and the connecting elements and contact parts of the two rows being fixed in a front part which is anchored in a rear part of the distributor. The improvement comprises a common rear part having a number of successive front parts and the rear part being designed to be inherently stable to form together with the attached front parts a self-supporting distributor module.

As a result of combining a number of rear parts to form a single, intrinsically stable component, an additional carrier for the contact components is no longer needed. Consequently, the installation step of inserting the contact components into the carrier part is dispensed with. It goes without saying that a rear part of this type should be produced using injection-molding technology, so that only one production step is required in order to form the holders for a large number of front parts. Injection molds of this type can be varied, by means of inserts, in such a way that the rear parts can be provided with a different number of holders for the front parts, as required.

By means of providing slot-like channels in the rear part between the front parts, the incoming and outgoing lines can be led in the channels right up to the associated connecting elements. The additional wire guide elements are therefore dispensed with.

The development of providing the rear part with web-like strips to form compartments to anchor each of the front parts results in a simple, material-saving and compact structure of the rear part. Molding by injection molding makes it possible, without any additional outlay, to provide comb-like guide slots for the lines, as well as fastening openings, for example, in the base plate, along the edges of the latter.

The invention will be explained in more detail below using an exemplary embodiment illustrated in the drawings.

DESCRIPTION OF THE PREFERRED EMBODIMENT

Figure 1:
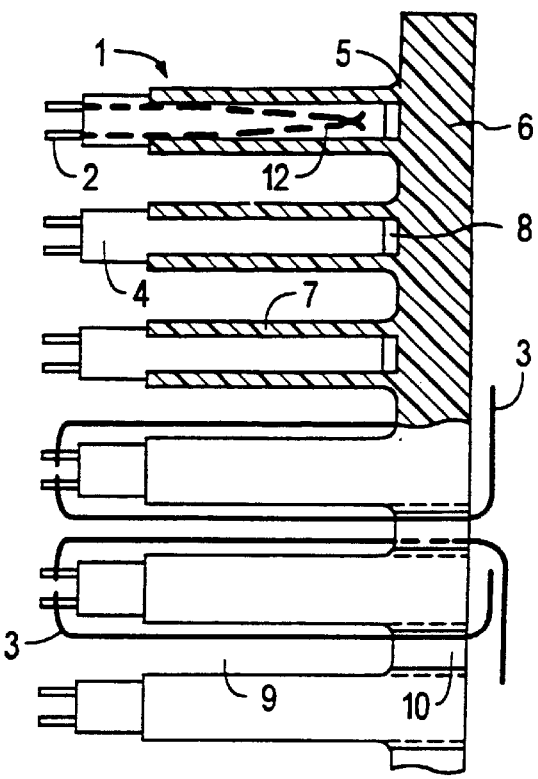
FIG. 1 shows, in a partly sectioned side view, a distributor for the connection and joining of incoming and outgoing lines.
Figure 2:
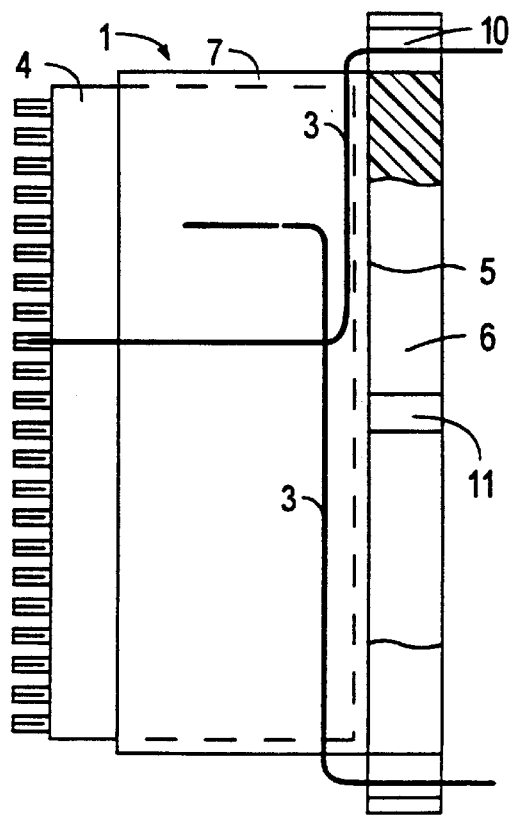
FIG. 2 shows a plan view of the distributor with portions broken away.

According to FIGS. 1 and 2, a distributor 1 having connecting elements 2 arranged in double parallel rows is provided for incoming and outgoing electric lines 3. The connecting elements 2 of a double row are in each case combined in a front part 4 and connected to one another in pairs via internal contact parts 12. The distributor 1 has a large number of flat front parts 4, which are held in a stack-like arrangement. A rear part 5, which is common to all the front parts 4, is provided with a continuous base plate 6, from which duct-like strips or flanges 7 extend to form compartments or sockets which are integral with the base plate 6. These strips are provided with holders 8, into which the front parts 4 are inserted from the side facing away from the base plate 6 in such a way that the contact parts 12 are fixed precisely.

Formed between the strips 7 are continuous, slot-like channels 9, in which the incoming and outgoing lines are led as far as the connecting elements 2, designed as insulation displacement terminals. Along its longitudinal sides, the base plate has slots or slot-like recesses 10 in a comb-like formation, in which the lines 3 are led out of the channels 9 toward the opposite rear side of the base plate 6. In addition, fastening openings 11 for the distributor 1 are integrally molded in the base plate along edges thereof.

We claim:

1. A distributor having connecting elements for incoming and outgoing electrical lines, said distributor comprising a plurality of front parts, each front part containing a row of contact parts, each contact part connecting two connecting elements with the connecting elements extending from the front part in two adjacent rows, and a rear part having a stable base plate having a plurality of strip-like continuous flanges extending from a surface of the base plate, each flange having a compartment for receiving one of the front parts, said base plate having elongated channels extending between two adjacent flanges to separate adjacent compartments from each other, so that the lines connected to the connecting elements are received in the channels.

2. The distributor according to claim 1, wherein the base plate is provided with openings along opposite edges of the plate.

3. The distributor according to claim 1, wherein the base plate has an edge with a plurality of inwardly extending slots spaced along the edge and being aligned with the channels.

4. The distributor according to claim 3, wherein the base plate has openings for mounting the distributor.

* * * * *